US011699272B2

(12) United States Patent
Tucker et al.

(10) Patent No.: US 11,699,272 B2
(45) Date of Patent: Jul. 11, 2023

(54) GENERATING FLUIDIC COMPONENTS

(71) Applicant: Hewlett-Packard Development Company, L.P., Spring, TX (US)

(72) Inventors: David James Tucker, Vancouver, WA (US); David Woodlock, Vancouver, WA (US); Jun Zeng, Palo Alto, CA (US); Michelle Lynn Bockman, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/252,034

(22) PCT Filed: Mar. 29, 2019

(86) PCT No.: PCT/US2019/025013
§ 371 (c)(1),
(2) Date: Dec. 14, 2020

(87) PCT Pub. No.: WO2020/204895
PCT Pub. Date: Oct. 8, 2020

(65) Prior Publication Data
US 2022/0012952 A1     Jan. 13, 2022

(51) Int. Cl.
*G06T 15/00*     (2011.01)
*G06T 19/20*     (2011.01)
(Continued)

(52) U.S. Cl.
CPC ............ *G06T 19/20* (2013.01); *B29C 64/386* (2017.08); *B33Y 50/00* (2014.12); *G06F 30/17* (2020.01);
(Continued)

(58) Field of Classification Search
USPC ........................................................ 345/418
See application file for complete search history.

(56) References Cited

U.S. PATENT DOCUMENTS 8,147,562 B2    4/2012    Vacanti et al.
8,491,083 B2    7/2013    Boday et al.
(Continued)

OTHER PUBLICATIONS

Saramito, P., & Wachs, A. (2017). Progress in numerical simulation of yield stress fluid flows. Rheologica Acta, 56(3), 211-230.*
(Continued)

*Primary Examiner* — Phu K Nguyen
(74) *Attorney, Agent, or Firm* — Michael Dryja

(57) ABSTRACT

An example device includes: a memory storing instructions; and a processor connected to the memory. The instructions are to cause the processor to: receive predetermined locations of a fluidic input location and fluidic output locations at a three-dimensional (3D) object model; generate respective paths between the fluidic input and each of the fluidic outputs via associated portions of the 3D object model; replace the respective paths with respective hollow connectors that have respective fluidic resistance selected such that each of the fluidic outputs have a predetermined flow rate from the fluidic input to the fluid outputs; and store, at the memory, data indicative of locations and dimensions of the respective hollow connectors, relative to the fluidic input and the fluidic outputs, the data for use by a three-dimensional printer to print a part that includes the fluidic input, the fluidic outputs and the respective hollow connectors.

15 Claims, 10 Drawing Sheets

(51) Int. Cl.
   *B33Y 50/00* (2015.01)
   *B29C 64/386* (2017.01)
   *G06F 30/17* (2020.01)
   *B33Y 80/00* (2015.01)
   *G06F 113/08* (2020.01)
   *G06F 113/10* (2020.01)
   *B29L 31/00* (2006.01)
   *B60N 2/56* (2006.01)

(52) U.S. Cl.
   CPC ......... *B29L 2031/771* (2013.01); *B33Y 80/00* (2014.12); *B60N 2/56* (2013.01); *G06F 2113/08* (2020.01); *G06F 2113/10* (2020.01); *G06T 2219/2021* (2013.01)

(56) References Cited

U.S. PATENT DOCUMENTS

| | | |
|---|---|---|
| 9,562,632 B1 | 2/2017 | Billman et al. |
| 9,844,912 B2 | 12/2017 | Hemingway et al. |
| 10,030,979 B2 | 7/2018 | Bjorke et al. |
| 10,354,018 B2 * | 7/2019 | Savage .................. G06F 30/00 |
| 10,470,730 B2 * | 11/2019 | Benishti ................. G16H 50/50 |
| 11,238,187 B2 * | 2/2022 | Nikolayev .............. G06F 30/13 |
| 11,308,413 B2 * | 4/2022 | Shahkarami ............ E21B 43/14 |
| 2007/0150244 A1 * | 6/2007 | Senecal ................. G06T 17/20 |
| | | 703/9 |
| 2014/0305529 A1 | 10/2014 | Kroll et al. |
| 2015/0370926 A1 | 12/2015 | Savage et al. |
| 2016/0136895 A1 | 5/2016 | Beyer et al. |
| 2017/0011547 A1 * | 1/2017 | Glaser .................... G06F 16/26 |
| 2017/0050677 A1 | 2/2017 | Czinget et al. |
| 2018/0050486 A1 | 2/2018 | Talgorn et al. |
| 2018/0272340 A1 | 9/2018 | Goyvadinov et al. |
| 2019/0039284 A1 | 2/2019 | Hertling et al. |

OTHER PUBLICATIONS

SimScale, Pipe Junction Flow Simulation—SimScale Tutorial, Jan. 13, 2015, https://www.youtube.com/watch?v=W0PV6ceSwmc.*

* cited by examiner

GENERATING FLUIDIC COMPONENTS

BACKGROUND

Iterative processes are often used to design complex fluidic systems for three-dimensional printing. Such processes may be difficult to use and/or consume a large amount processing resources and/or may be inefficient and/or may be time consuming.

BRIEF DESCRIPTION OF THE DRAWINGS

Reference will now be made, by way of example only, to the accompanying drawings in which.

DETAILED DESCRIPTION

Iterative processes are often used to design complex fluidic systems for three-dimensional (3D) printing, which may be difficult to use and/or consume a large amount processing resources and/or may be inefficient and/or may be time consuming. Furthermore, it is advantageous to drive down the cost of 3D printing. One approach to driving down cost is to scale up 3D printing manufacturing such that 3D printing may be used to produce high-volume numbers of parts, for example for the automotive industry. However, such parts are generally designed to be manufactured using more traditional techniques and not for 3D printing. Hence, a step towards high-volume production of such parts using 3D printing is to adapt such parts, and data for manufacturing such parts, for 3D printing. To promote manufacture of such parts using 3D printing, new functionality may be provided to such parts that may not be possible using non-3D printing techniques.

For example, heating, ventilation, and air conditioning (HVAC) systems for vehicles is one area in which designing complex fluidic systems may be particularly pertinent as HVAC systems for vehicles, and three-dimensionally printed parts may include features not available with other manufacturing techniques. However, such HVAC systems for three-dimensionally printed parts may be particularly difficult to design. Furthermore, it may be useful to incorporate cooling (and/or heating) systems into the seating in a manner that combines multiple functions into a single part.

In the present specification, this may be achieved via geometrical complexity in an object, such as a vehicle seat, that enables functional complexity such as fluid pathways incorporated into the seat which may be used for in-seat cooling and/or heating. Manufacture of such parts may be difficult and/or at least not economical to fabricate except using 3D printing.

Hence, provided herein is a device which may have preinstalled software to generate fluidic components and/or to generate data indicative of locations and dimensions of a respective hollow connectors of a part, relative to a predetermined fluidic input location and predetermined fluidic output locations, the data for use by a three-dimensional printer to print a part that includes the fluidic input location, the fluidic output locations and the respective hollow connectors.

Figure 1:
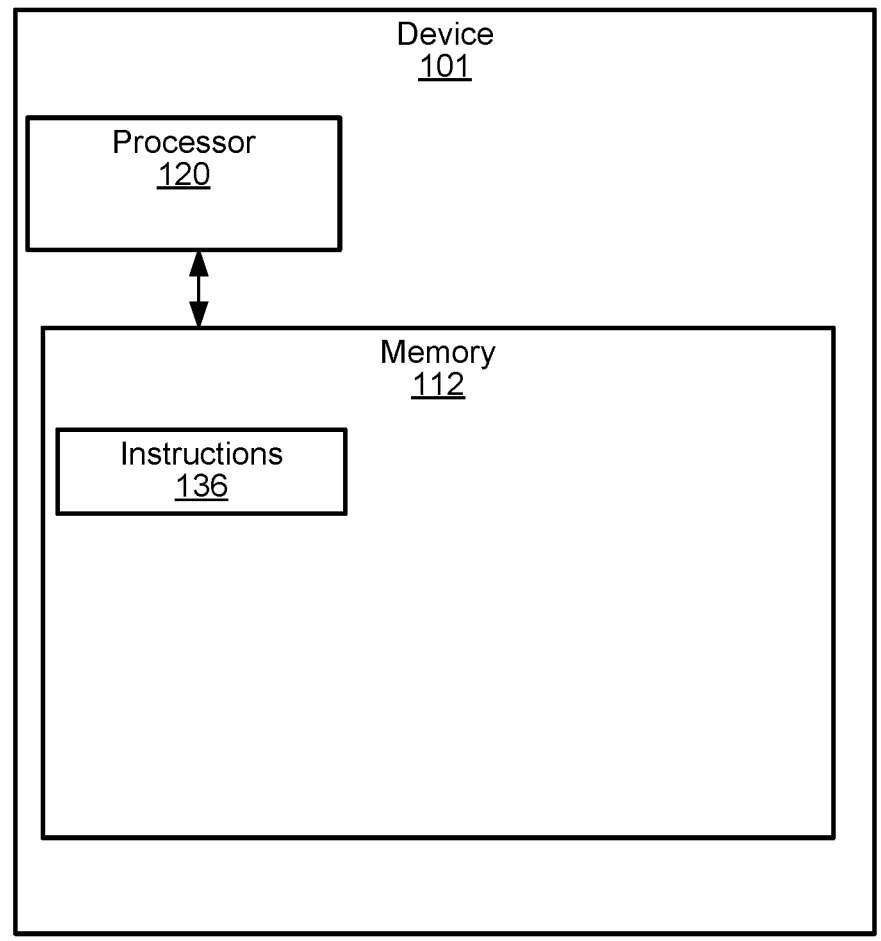
FIG. 1 is a block diagram of an example device to generate fluidic components, according to an example.

Referring to FIG. 1, a device 101 to generate fluidic components is depicted. The device 101 comprises: a memory 112; and a processor 120 connected to the memory 112, the memory 112 storing instructions 136, the processor 120 to execute the instructions 136 to cause the processor 120 to: receive predetermined locations of a fluidic input location and fluidic output locations at a three-dimensional (3D) object model; generate respective paths between the fluidic input location and each of the fluidic output locations via associated portions of the 3D object model; replace the respective paths with respective hollow connectors that have respective fluidic resistance selected such that each of the fluidic output locations have a similar flow rate and/or a same flow rate and/or a predetermine flow rate from the fluidic input location to the fluid output locations; and store, at the memory 112, data indicative of locations and dimensions of the respective hollow connectors, relative to the fluidic input location and the fluidic output locations, the data for use by a three-dimensional printer to print a part that includes that includes the fluidic input location, the fluidic output locations and the respective hollow connectors.

In some specific examples, the device 101 comprises: the memory 112; and the processor 120 connected to the memory 112, the memory 112 storing instructions 136, the processor 120 to execute the instructions 136 to cause the processor 120 to: receive predetermined locations of a fluidic input location and fluidic output locations at a three-dimensional (3D) object model; generate respective paths between the fluidic input location and each of the fluidic output locations via associated portions of the 3D object model; replace the respective paths with respective hollow connectors that have respective fluidic resistance selected such that each of the fluidic output locations have a predetermined flow rate from the fluidic input location to the fluid output locations; and store, at the memory 112, data indicative of locations and dimensions of the respective hollow connectors, relative to the fluidic input location and the fluidic output locations, the data for use by a three-dimensional printer to print a part that includes that includes the fluidic input location, the fluidic output locations and the respective hollow connectors.

While the fluidic input location, the fluidic output locations, the 3D object model and the flow rate are not depicted in FIG. 1, the fluidic input location, the fluidic output locations, the 3D object model and/or the flow rate may be stored at the memory and/or stored at an external device with which the device 101 is in communication; and/or the fluidic input location and the fluidic output locations be determined by the device 101, for example based on a given flow profile at a surface of the 3D object model as described in more detail below.

The device 101 may include additional components, such as various additional interfaces and/or input/output devices such as display screens to interact with a user or an administrator of the device 101.

The device 101 may include other additional components such as a communication interface is to communicate with external devices to receive the fluidic input location, the fluidic output locations, the 3D object model and/or the similar flow rate and/or the same flow rate and/or the predetermined flow rate, for example via a network, such as a wired or wireless network which may include the Internet, a cellular network, a WiFi network, and the like.

The memory 112 is coupled to the processor 120 and includes a non-transitory machine-readable storage medium that may be any electronic, magnetic, optical, or other physical storage device. The non-transitory machine-readable storage medium of the memory 112 may include, for example, random access memory (RAM), electrically-erasable programmable read-only memory (EEPROM), flash memory, a storage drive, an optical disc, and the like. The memory 112 may also be encoded with executable instructions to operate a communication interface, when present, and/or other hardware in communication with the processor 120. In other examples, it is to be appreciated that the memory 112 may be substituted with a cloud-based storage system. The non-transitory machine-readable storage medium of the memory 112 is generally encoded with the instructions 136 executable by the processor 120 of the device 101.

The non-transitory machine-readable storage medium of the memory 112 may include, for example, random access memory (RAM), electrically-erasable programmable read-only memory (EEPROM), flash memory, a storage drive, an optical disc, and the like. The memory 112 may also be encoded with executable instructions to operate a communication interface, when present, and/or other hardware in communication with the processor 120. In other examples, it is to be appreciated that the memory 112 may be substituted with a cloud-based storage system.

The memory 112 may also store an operating system that is executable by the processor 120 to provide general functionality to the device 101, for example, functionality to support various applications such as a user interface to access various features of the device 101. Examples of operating systems include Windows™, macOS™, iOS™, Android™, Linux™, and Unix™. The memory 112 may additionally store applications that are executable by the processor 120 to provide specific functionality to the device 101, and which may include the instructions 136.

The processor 120 may include a central processing unit (CPU), a microcontroller, a microprocessor, a processing core, a field-programmable gate array (FPGA), an application-specific integrated circuit (ASIC) or similar. The processor 120 and memory 112 may cooperate to execute various instructions such as the instructions 136.

Accordingly, the processor 120 may execute instructions stored on the memory 112 to provide the data indicative of locations and dimensions of the respective hollow connectors, relative to the fluidic input location and the fluidic output locations, to a three-dimensional printer to print a part that includes the fluidic input location, the fluidic output locations and the respective hollow connectors; such instructions may be in addition to the instructions 136 and/or a component of the instructions 136.

Indeed, the data indicative of locations and dimensions of the respective hollow connectors, relative to the fluidic input location and the fluidic output locations, may be be used by the device 101 to control a three-dimensional printer to print a part that includes the fluidic input location, the fluidic output locations and the respective hollow connectors.

In some of these examples, the device 101 and/or the processor 120 and/or the instructions 136 may be further to: partition the 3D object model into portions, which may be used to determine the respective pathways between the fluidic input location and each of the fluidic output locations. Hence, while in some examples the 3D object model may be pre-partitioned and/or previously partitioned into portions, in other examples, the device 101 and/or the processor 120 and/or the instructions 136 may be to partition the 3D object model.

In some of these examples, the device 101 and/or the processor 120 and/or the instructions 136 may be further to: partition the 3D object model into portions by partitioning (e.g. into voxels and/or 3D pixels) the 3D object model into a hierarchical structure that organizes these portions. Such a hierarchical structure may include, but is not limited to, an octree which may be used, for example to organize the portions; furthermore, such portions may include, but are not limited to, voxels described in more detail below. A hierarchical structure partitioning procedure may result in the fluidic output locations being located in respective portions of the hierarchical structure, with a first portion of the hierarchical structure including the fluidic input location. In some specific examples, the hierarchical structure partitioning procedure may result in each of the fluidic output locations being located in a respective portion of the hierarchical structure, with a first portion of the hierarchical structure including the fluidic input location For example, when the hierarchical structure includes an octree, the octree partitioning procedure may result in the fluidic output locations (and/or each of the fluidic output locations) being located in a respective leaf node of the octree, and a root node of the octree including the fluidic input location.

In some of these examples, the device 101 and/or the processor 120 and/or the instructions 136 may be further to: generate respective paths between the fluidic input location and each of the fluidic output locations via centers or vertices or faces of portions of the 3D object model that include a fluidic output location or include a respective fluidic output location in a respective sub-portion of the 3D object model. For example, when the hierarchical structure includes an octree, the device 101 and/or the processor 120 and/or the instructions 136 may be further to: generate respective paths between the fluidic input location and each of the fluidic output locations via: centers or vertices or faces of respective internal nodes of the octree that include a leaf node that includes a fluidic output location; or respective centers or respective vertices or respective faces of leaf nodes of the octree that include a respective fluidic output location.

In some of these examples, the device 101 and/or the processor 120 and/or the instructions 136 may be further to: adjust the respective fluidic resistance of a respective hollow connector by adjusting fluidic resistance of a respective fluidic output location.

In some of these examples, the device 101 and/or the processor 120 and/or the instructions 136 may be further to: adjust the respective fluidic resistance of a respective hollow connector by adjusting fluidic resistance of a respective branch in the respective hollow connector corresponding to a center or vertex or face of a portion of the 3D object model and/or the hierarchical structure (e.g. of a center or vertex or face of a node of an octree).

In some of these examples, the device 101 and/or the processor 120 and/or the instructions 136 may be further to: route a respective path around predefined features of the 3D object model.

In some of these examples, the device 101 and/or the processor 120 and/or the instructions 136 may be further to: recursively partition the 3D object model into a hierarchical structure and/or an octree based on geometric partitioning and/or until one or two of the fluidic output locations are located in a respective portion of the hierarchical structure and/or a respective leaf node of the octree.

Hence, in some examples, the partitioning may be performed using voxelization and an octree. In these examples, the device 101 and/or the processor 120 and/or the instructions 136 may be further to: receive predetermined locations of a fluidic input location and fluidic output locations at a 3D object model; partition and/or voxelize the 3D object model into an octree until each of the fluidic output locations is located in a respective leaf node of the octree, a root node of the octree including the fluidic input location; generate respective paths between the fluidic input location and each of the fluidic output locations via: centers or vertices or faces of respective internal nodes of the octree that include a leaf node that includes a fluidic output location; or respective centers or respective vertices or respective faces of leaf nodes of the octree that include a respective fluidic output location; replace the respective paths with respective hollow connectors that have respective fluidic resistance selected such that each of the fluidic output locations have a similar flow rate and/or same flow rate and/or a predetermined flow rate from the fluidic input location to the fluid output locations; and store, at the memory 112, data indicative of locations and dimensions of the respective hollow connectors, relative to the fluidic input location and the fluidic output locations, the data for use by a three-dimensional printer to print a part that includes the fluidic input location, the fluidic output locations and the respective hollow connectors.

In some of these examples, the device 101 and/or the processor 120 and/or the instructions 136 may be further to: to partition the 3D object model into the octree such that: first internal nodes of the octree that include more than one of the fluidic output locations are recursively partitioned until each of the fluidic output locations is located in a respective leaf node of the first internal nodes; and second internal nodes that do not include a respective fluidic output location are not further partitioned (and hence may be designated as leaf nodes).

In some of these examples, the device 101 and/or the processor 120 and/or the instructions 136 may be further to: when a respective path between the fluidic input location and a respective fluidic output location includes one node center or one node vertex or one node face, regenerate the respective path bypassing the node center or the node vertex or the node face.

In some of these examples, the device 101 and/or the processor 120 and/or the instructions 136 may be further to: select the respective fluidic resistance of the respective hollow connectors by selecting a respective length, a respective cross-sectional area, and a respective cross-sectional shape of the respective hollow connectors.

In some of these examples, the device 101 and/or the processor 120 and/or the instructions 136 may be further to: replace the respective paths with the respective hollow connectors that have the respective fluidic resistance selected such that fluidic resistance distribution is balanced at each level of the octree.

In yet further examples, the locations of the fluidic input location and the fluidic output locations may not be received at the device 101. Rather, in these examples, the device 101 and/or the processor 120 and/or the instructions 136 may be further to generate fluidic output locations at the 3D object model based on a given flow profile at a surface of the 3D object model. In particular, in these examples, the device 101 and/or the processor 120 and/or the instructions 136 may be further to: generate fluidic output locations at the 3D object model based on a given flow profile at a surface of the 3D object model; generate respective paths between the fluidic input location and each of the fluidic output locations via associated portions of the 3D object model; replace the respective paths with respective hollow connectors that have respective fluidic resistance selected such that each of the fluidic output locations have a similar flow rate and/or same flow rate and/or predetermined flow rate from the fluidic input location to the fluid output locations; and store, at the memory 112, data indicative of locations and dimensions of the respective hollow connectors, relative to the fluidic input location and the fluidic output locations, the data for use by a three-dimensional printer to print a part that includes the fluidic input location, the fluidic output locations and the respective hollow connectors.

In some of these examples, the given flow profile may comprise a flow velocity vector distribution at the surface of the part, as represented by the 3D object model, and the device 101 and/or the processor 120 and/or the instructions 136 may be further to: project flow velocity vectors of the flow velocity vector distribution towards an outward surface normal over the surface of the part to obtain an intensity image; apply a threshold filter to identify spots of the intensity image with intensity above a threshold value; and assign the fluidic output locations to the spots to generate the fluidic output locations of the 3D object model based on the given flow profile at the surface of part, as represented the 3D object model. For example, the intensity image may include, but is not limited to, any suitable intensity image obtainable by projecting flow velocity vectors of the flow velocity vector distribution towards an outward surface normal over the surface of the part. For example, the intensity image may represent cooling and/or heating that occurs at the surface of the part, represented by the 3D object model, due to the flow velocity vectors.

In some of these examples, the given flow profile may comprise a flow velocity vector distribution at the surface of the part, as represented by the 3D object model, and the device 101 and/or the processor 120 and/or the instructions 136 may be further to: project flow velocity vectors of the flow velocity vector distribution towards an outward surface normal over the surface of the part to obtain an intensity image; apply an intensity enhancement operator or an inverse-diffusion operator to the intensity image to increase contrast of the intensity image; apply a threshold filter to identify spots of the intensity image with intensity above a threshold value; and assign the fluidic output locations to the spots to generate the fluidic output locations of the 3D object model based on the given flow profile at the surface of the 3D object model.

In some of these examples, the given flow profile may comprise a flow velocity vector distribution at the surface of the part, as represented by the 3D object model, and the device 101 and/or the processor 120 and/or the instructions 136 may be further to: project flow velocity vectors of the flow velocity vector distribution towards an outward surface normal over the surface of the part to obtain an intensity image; apply a threshold filter to identify spots of the intensity image with intensity above a threshold value; increase or decrease the threshold filter to respectively decrease or increase a number of the spots; and assign the fluidic output locations to the spots to generate the fluidic output locations of the 3D object model based on the given flow profile at the surface of the 3D object model.

However, any suitable process and/or technique to generate locations of a fluidic input location and fluidic output locations are within the scope of the present specification.

Furthermore, while the device 101 and/or techniques described herein are described with respect to a plurality of fluidic output locations, the device 101 and/or techniques described herein may be adapted for examples that include one fluidic output location.

Figure 2:
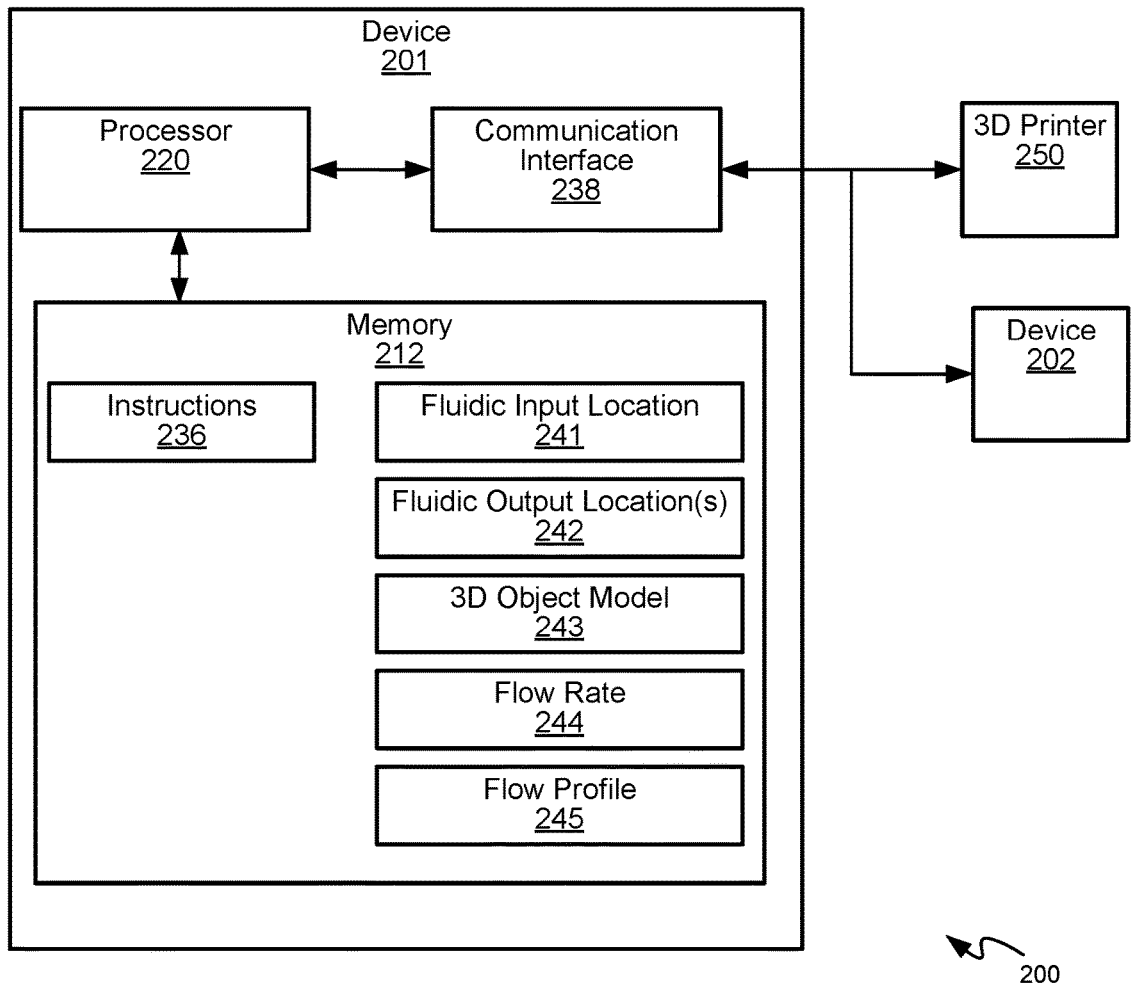
FIG. 2 is a block diagram of a system to generate fluidic components, according to an example.

Attention is next directed to FIG. 2 which depicts a system 200 that includes a device 201 to generate fluidic components and a second device 202 in communication with the device 201, the second device 202 being external to the device 201 in some examples; hence, the second device 202 is interchangeably referred to hereafter as the external device 202. However, in some examples, the external device 202 may be at least partially integrated with the device 201.

The device 201 is generally similar to the device 101, with like components having like numbers, but in a "200" series rather than a "100" series. While not depicted, the external device 202 has a similar structure to the device 201, however with respective instructions adapted for the functionality of the external device 202.

Hence, in these examples, the device 201 comprises: a memory 212; and a processor 220 connected to the memory 212, the memory 212 storing instructions 236 similar to the instructions 236.

In contrast to the device 101, the device 201 further comprises a communication interface 238, and the memory 212 of the device 201 further stores a fluidic input location 241, a fluidic output location 242 and/or fluidic output locations 242, a 3D object model 243, a flow rate 244 and a given flow profile 245 of the 3D object model 243. The locations 241, 242 may be generated by the device 201 and/or received at the device 201, via the communication interface 238, from the external device 202. Similarly, the 3D object model 243, the flow rate 244 and the flow profile 245 may be received at the device 201, via the communication interface 238, from the external device 202.

In some of these examples, the external device 202 may be a device of a designer of a part to be generated by a 3D printer; indeed, as depicted, the system 200 may comprise a 3D printer 250 in communication with the device 201 via the communication interface 238, for example via a wired and/or wireless communication link (which may include, but is not limited to, wired and/or wireless communication networks). Communication links between components of the system 200 are depicted as double-headed arrows therebetween.

The 3D printer 250 may comprise a 3D printer for 3D printing of automotive parts, including, but not limited to seats, and the like, for automotive vehicles. Any suitable 3D printer for 3D printing any suitable 3D part is within the scope of the present specification.

Figure 3:
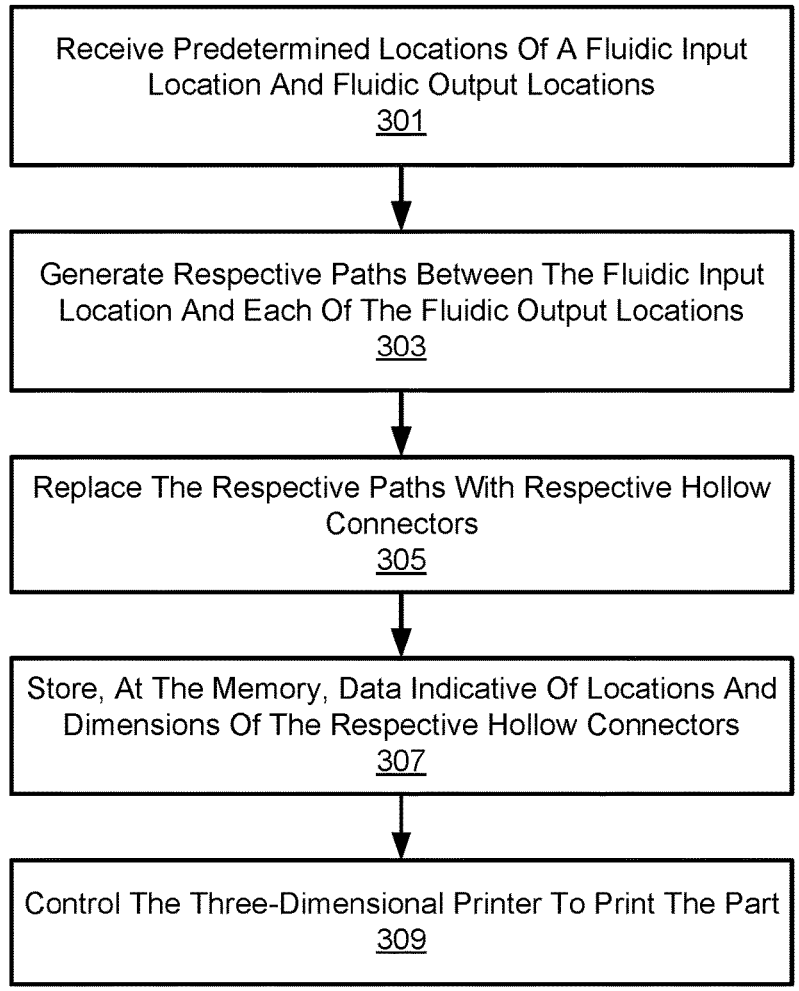
FIG. 3 is a flowchart of an example of a method to generate fluidic components, according to an example.

Referring to FIG. 3, a flowchart of an example method 300 to generate fluidic components is depicted. In order to assist in the explanation of method 300, it will be assumed that method 300 may be performed with the device 201, and specifically by the processor 220 implementing the instructions 236. Indeed, the method 300 may be one way in which device 201 may be configured to interact with the 3D printer 250. Furthermore, the following discussion of method 300 may lead to a further understanding of the processor 220, the device 201, the system 200, and their various components. Furthermore, the method 300 may be performed with the device 201, and for example by the processor 220 implementing the instructions 236. Furthermore, it is to be emphasized, that method 300 may not be performed in the exact sequence as shown, and various blocks may be performed in parallel rather than in sequence, or in a different sequence altogether.

It is further understood that the term "fluidic" as used herein may refer to both liquids and gas (e.g. air) flowing from a fluidic input location to fluidic output locations. Such liquids and/or air may be used to heat or cool a part that may be 3D printed by the 3D printer 250. Furthermore, the terms gas and air may be used interchangeably herein, and the term "air" may refer to any suitable gas and/or composition of gas.

Beginning at a block 301, the processor 220 receives predetermined locations of the fluidic input location 241 and fluidic output locations 242 at the 3D object model 243. For example, the fluidic input location 241 and fluidic output locations 242 may be received from the external device 202. In some examples, at the block 301, the 3D object model 243 may be received from the external device 202. In yet further examples, at the block 301, the flow rate 244 may be received from the external device 202; for example, the flow rate 244 may include, but is not limited to, a flow rate of fluid and/or air output from an HVAC system, which may have a set and/or predetermined output associated with the HVAC system. Furthermore, the flow rate 244 may not be an actual flow rate that occurs in the part as represented by the 3D object model 243, but may be a target flow rate and/or a flow rate used to determine hollow connectors, as described below; indeed, the actual flow rate in a part represented by the 3D object model 243 may generally depend on a pressure and/or speed of fluid (e.g. liquid and/or air) input to the fluidic input location 241. Hence, the flow rate 244 may be a predetermined flow rate used to determine hollow connectors, as described in more detail below, while the actual flow rate in a part, when 3D printed, may be different from the flow rate 244.

In particular, the fluidic input location 241 may correspond to a predetermined location of a hose and/or pipe and/or connector at the part represented by the 3D object model 243, for example when connecting the part to an HVAC system of a larger system, such as a vehicle, into which the part is to be integrated after being manufactured. The fluidic input location 241 may include dimensions of the fluidic input location 241, for example in 3D coordinates and/or a 3D printing format, and the like.

In some examples, the fluidic output locations 242 may correspond to predetermined locations where a designer of the part has placed fluidic output locations of the part based, for example, on aesthetic considerations and/or using a technique for locating the fluidic output locations 242 such as that described below with respect to FIG. 4. However, in the examples, the fluidic output locations 242 may correspond to predetermined locations of hoses and/or pipes and/or connectors at the part represented by the 3D object model 243, for example when connecting the part to an HVAC system of a larger system, such as a vehicle, into which the part is to be integrated after being manufactured. The fluidic output locations 242 may include dimensions of the fluidic output locations 242, for example in 3D coordinates and/or a 3D printing format, and the like.

In other examples, however, the block 301 may be optional and the processor 220 may generate the fluidic output locations 242 at the 3D object model 243 based on the given flow profile 245 at a surface of the 3D object model 243, as described in more detail below with respect to FIG. 4. In examples where the fluidic input location 241 and fluidic output locations 242 are received at the block 301, however, the given flow profile 245 may be optional and may not be stored at the memory 212.

At a block 303, the processor 220 generates respective paths between the fluidic input location 241 and each of the fluidic output locations 242 via associated portions of the 3D object model 243.

In some examples, at the block 303, the processor 220 may partition the 3D object model 243, for example using three-dimensional portions and/or voxels and/or hierarchical structures and/or octrees. In particular, the processor 220 may partition the 3D object model 243 into an octree until each of the fluidic output locations is located in a respective leaf node of the octree, a root node of the octree including the fluidic input location.

In such examples, first internal nodes of the octree that include more than one of the fluidic output locations are recursively partitioned until each of the fluidic output locations is located in a respective leaf node of the first internal nodes. Furthermore, second internal nodes that do not include a respective fluidic output location are not further partitioned and/or further voxelization of such second internal nodes is prevented; in these examples, prevention of further partitioning of such second internal nodes that do not include a respective fluidic output location may reduce processing time of the partitioning.

However, any suitable partitioning of the 3D object model 243 into portions is within the scope of the present specification. In yet further examples, the external device 202 may partition the 3D object model 243 into portions, and the processor 220 may received the 3D object model 243 (e.g. at the block 301) in a partitioned state.

At a block 305, the processor 220 replaces the respective paths with respective hollow connectors that have respective fluidic resistance selected such that each of the fluidic output locations have the flow rate 244 (e.g. a similar flow rate and/or a same flow rate and/or a predetermined flow rate) from the fluidic input location 241 to the fluidic output locations 242. For example, the respective hollow connectors follow the same and/or a similar path as the respective paths but have an inner diameter through which fluid flows and which may in some examples, include an outer diameter; it is further understood that the hollow connectors of the block 305 are represented using 3D printer coordinates and/or information used by the 3D printer 250 to print the respective hollow connectors, and the like, as described below.

In examples where the fluidic input location 241 and/or the fluidic output locations 242 are to be connected to an HVAC system, and the like, dimensions of the fluidic input location 241 and/or the fluidic output locations 242 may be predetermined, and the dimensions of the respective hollow connectors at the fluidic input location 241 and/or the fluidic output locations 242 may be determined accordingly. However, in other examples, the block 305 may include determining dimensions of the fluidic input location 241 and/or the fluidic output locations 242.

At a block 307, the processor 220 stores, at the memory 212, data indicative of locations and dimensions of the respective hollow connectors, relative to the fluidic input location 241 and the fluidic output locations 242, the data for use by the three-dimensional printer 250 to print a part that includes the fluidic input location 241, the fluidic output locations 242 and the respective hollow connectors. The data may generally be in a 3D printing format comprising 3D printer coordinates, and/or information used by the 3D printer 250 to print the part, and the like.

In the depicted example, at a block 309, the processor 220 controls the 3D printer 250 to print the part using the data stored at the block 307. For example, the processor 220 may communicate with the 3D printer 250 via a respective communication link to control the 3D printer to print the part. However the block 309 may be optional and in some examples the method 300 may comprise block 301, block 303, block 305 and block 307 (e.g. and not block 309).

For example, the data stored at the memory 212 at the block 307 may be transmitted to another device (e.g. a device associated with the 3D printer 250 and/or the external device 202) for storage thereupon, and/or the data stored at the memory 212 may be retrieved another device (e.g. a device associated with the 3D printer 250 and/or the external device 202) and used by the another device to print the part using the 3D printer 250.

Figure 4:
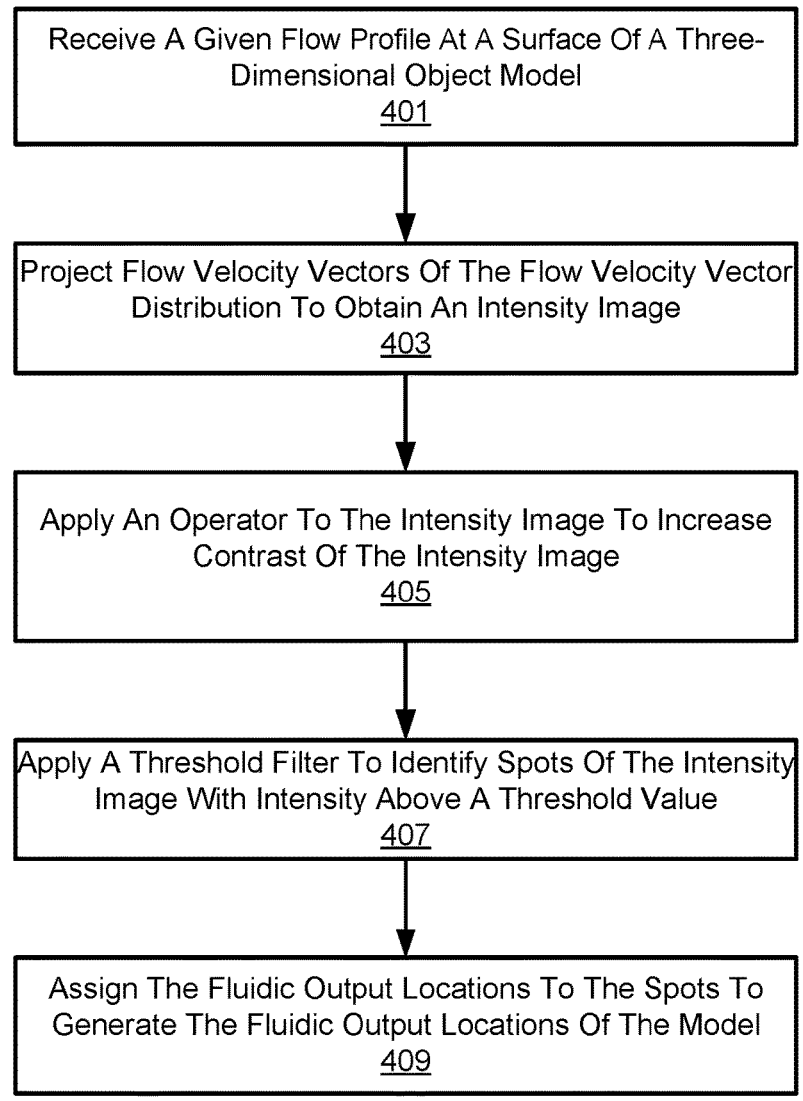
FIG. 4 is a flowchart of an example of a method to generate fluidic output locations at a three-dimensional object model, according to an example.

Referring to FIG. 4, a flowchart of a method 400 to generate fluidic output locations at a three-dimensional object model is depicted. In order to assist in the explanation of method 400, it will be assumed that method 400 may be performed with the device 201, and specifically by the processor 220 implementing the instructions 236. Furthermore, the following discussion of method 400 may lead to a further understanding of the processor 220, the device 201, the system 200, and their various components. Furthermore, the method 400 may be performed with the device 201, and for example by the processor 220 implementing the instructions 236. Furthermore, it is to be emphasized, that method 400 may not be performed in the exact sequence as shown, and various blocks may be performed in parallel rather than in sequence, or in a different sequence altogether.

It is further understood that the term "fluidic" as used herein may refer to both liquids and gas (e.g. air) flowing from a fluidic input location to fluidic output locations. Furthermore, the terms gas and air may be used interchangeably herein, and the term "air" may refer to any suitable gas and/or composition of gas.

It is further understood that the method 400 may be used to generate the fluidic output locations 242.

Beginning at a block 401, the processor 220 receives the given flow profile 245. For example, the given flow profile 245 may be received from the external device 202. In some examples, at the block 401, the 3D object model 243 may also be received from the external device 202. The flow profile 245 may be uniform or nonuniform. In some examples, at the block 401, the fluidic input location 241 may also be received from the external device 202. Furthermore, the flow profile 245 may comprise a liquid flow profile or an airflow profile.

In some examples, as depicted, the given flow profile 245 comprises a flow velocity vector distribution at the surface of a part (e.g. to be printed by the 3D printer 250), as represented by the 3D object model 243. While the remainder of the method 400 will be described with respect to the given flow profile 245 comprising a flow velocity vector distribution, in other examples, the given flow profile 245 may be represented by other types of flow distributions and the like. Furthermore, the flow velocity vector distribution may comprise a liquid flow velocity vector distribution or an airflow velocity vector distribution. Regardless, the given flow profile 245 may represent a target flow profile (e.g. liquid or air) at the surface of the part, which may be used to generate a target distribution of heat at the surface of the part.

At a block 403, the processor 220 projects flow velocity vectors of the flow velocity vector distribution towards an outward surface normal over the surface of the part (e.g. as represented by the 3D object model 243) to obtain an intensity image. The intensity image may generally represent the target distribution of heat at the surface of the part and/or any other suitable type of target distribution parameters represented by the flow velocity vectors of the flow velocity vector distribution.

At the block 405, which may be optional, the processor 220 applies an operator to the intensity image to increase contrast of the intensity image. In some examples, the operator comprises an intensity enhancement operator and/or an inverse-diffusion operator and/or a convolutional operator, however any suitable operator for increasing contrast of the intensity image is within the scope of the present specification. Such operators may be used to increase contrast to locate spots of the intensity image where heating or cooling is desired to achieve the target distribution of heat at the surface of the part, and, for example, where to locate the fluidic input location 241 and the fluidic output locations 242.

At a block 407, the processor 220 applies a threshold filter to identify spots of the intensity image (e.g. which may be enhanced at the block 405) with intensity above a threshold value. Each of the spots of the intensity image identified at the block 407 may generally correspond to the fluidic output locations 242. Furthermore, the value of the threshold filter may be increased or decreased to respectively decrease or increase a number of the spots for example to decrease or increase a number of the fluidic output locations 242. Furthermore, the intensity contrast enhancement of the block 405 may be also be used to increase or decrease the number of spots (e.g. by increasing or decreasing the contrast of the intensity image).

At a block 409, the processor 220 assigns the fluidic output locations 242 to the spots to generate the fluidic output locations 242 of the 3D object model 243 based on the given flow profile at the surface of the 3D object model 243.

The fluidic output locations 242 generated by the method 400 may be used in the method 300 as described above.

Attention is next directed to FIG. 5 to FIG. 10 which depicts an example of the method 300 and the method 400.

For example, FIG. 5 to FIG. 10 each depicts the system 200 and/or the device 201, and/or portions of the system 200 and/or the device 201; while not all components of the system 200 and/or the device 201 are depicted in each of FIG. 5 to FIG. 10, such components are understood to be present. Furthermore, in FIG. 5 to FIG. 10, the processor 220 of the device 201 is implementing the instructions 236.

Figure 5:
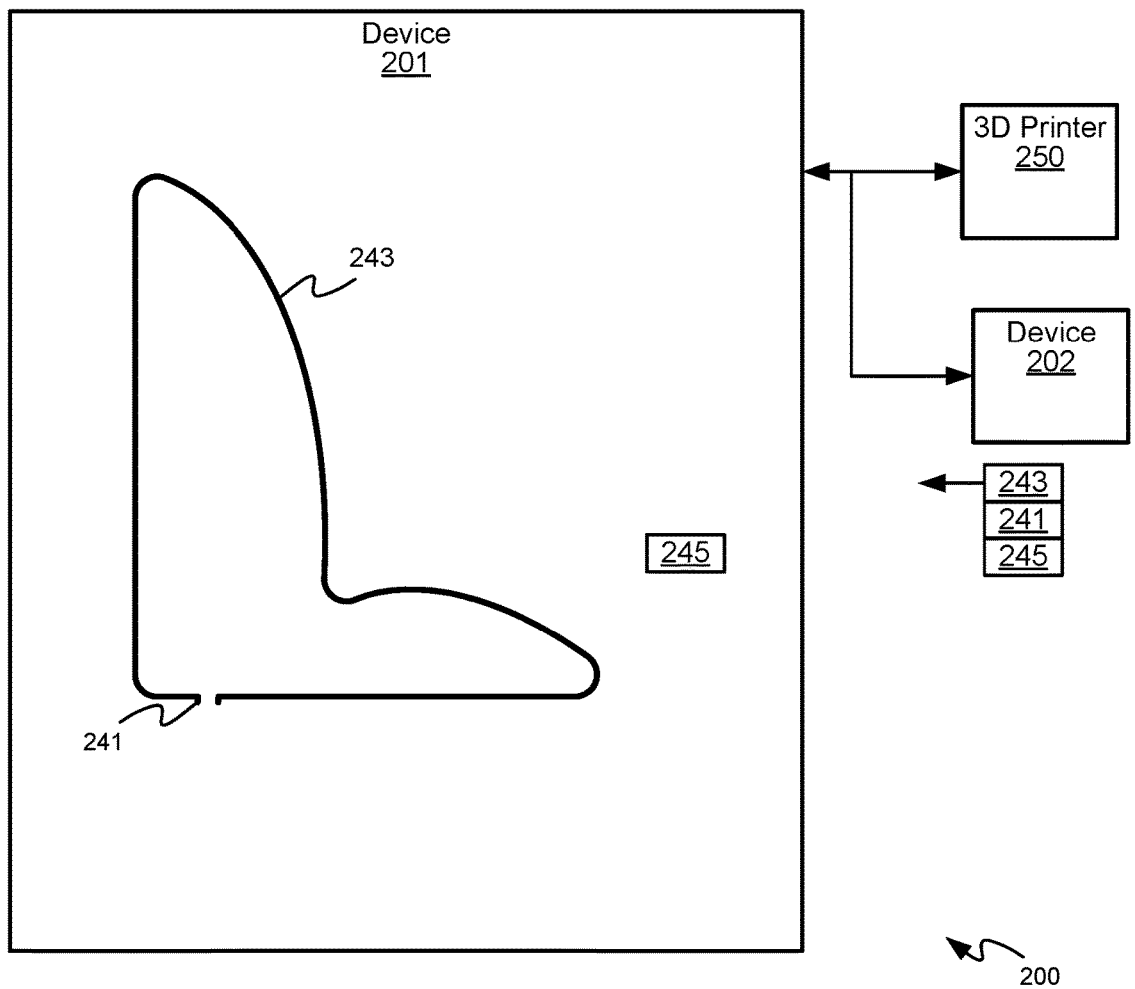
FIG. 5 is a block diagram of a system implementing a portion of a method to generate fluidic components, according to an example.

Attention is first directed to FIG. 5, which depicts an aspect of the block 301 of the method 300 and/or an aspect of the block 401 of the method 400. In particular, in FIG. 5, the device 201 receives the fluidic input location 241 and the 3D object model 243 from the external device 202. In these examples the device 201 is to generate the fluidic output locations 242 using the method 400, however the fluidic input location 241 at the 3D object model 243 is predetermined, for example based on a given location of an HVAC connector at system into which a part represented by the 3D object model 243 is to be integrated.

Indeed, FIG. 5 further depicts an example of the 3D object model 243 being a car seat into which HVAC heating and cooling is to occur. While the 3D object model 243 is depicted in two-dimensions, it is understood that the 3D object model 243 comprises a 3D representation of the car seat. Furthermore, the car seat is to be integrated into a vehicle where an HVAC connector is located under the car seat; hence, the fluidic input location 241 is depicted as being located at a bottom side of the car seat as represented by the 3D object model 243. For example, such an HVAC connector may be to connect the fluidic input location 241 to the HVAC system to cause warmed air and/or cooled air into the fluidic input location 241 to the fluidic output locations 242 to be determined as described hereafter, for example using the flow profile 245 which is also depicted as being received from the external device 202.

While not depicted, the 3D object model 243 may include predefined features internal to the 3D object model 243 such as areas of higher or lower density that correspond, for example, to wiring and/or areas where wiring is to be located, and the like.

Figure 6:
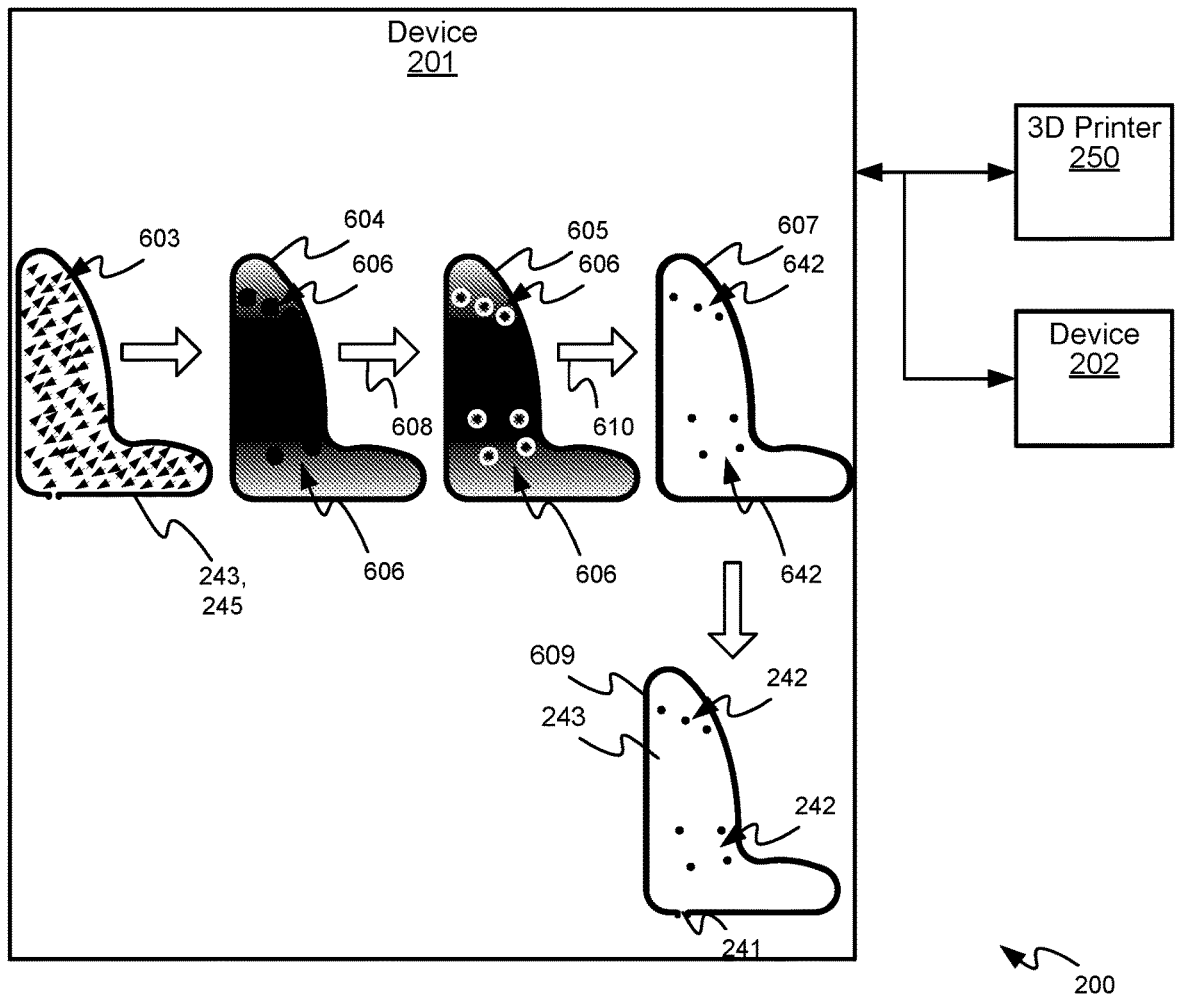
FIG. 6 is a block diagram of a system implementing a portion of a method to generate fluidic output locations at a three-dimensional object model, according to an example.

Attention is next directed to FIG. 6 which depicts an example of the device 201 (e.g. the processor 220) implementing the block 403, the block 405, the block 407, and the block 409 of the method 400. For example, FIG. 6 schematically depicts the device 201, at the block 403, projecting flow velocity vectors 603 of the flow profile 245 towards an outward surface normal over the surface of the part, as represented by the 3D object model 243, to obtain an intensity image 604. Furthermore, distribution of the flow velocity vectors 603 may not be uniform and/or may be indicative of differential cooling rates and/or heating rates at different areas of the part. As represented by the 3D object model 243, for example when a body (e.g. a human body) is in contact with the part. Hence, the flow velocity vectors 603 may represent a target distribution of flow at the surface of the part for cooling and/or heating; similarly, the intensity image 604 may represent a target distribution of heat (e.g. due to heating and/or cooling) at the surface of the part due to the flow velocity vectors 603.

As also depicted in FIG. 6, the intensity image 604 includes regions 606 where the intensity, is higher than other regions (e.g. either hotter or colder than other regions). In order to better isolate and/or determine fluidic output locations 242 that may correspond to such regions 606, the device 201 generates an increased contrast intensity image 605, for example at the block 405 of the method 400, by applying an operator 608 (as described above) to the intensity image 604. As depicted in the increased contrast intensity image 605, the regions 606 are sharper and/or are better distinguishable from other regions of the increased contrast intensity image 605 than in the intensity image 604.

As also depicted in FIG. 6, the device 201, generates an updated version of the intensity image 607 (e.g. at the block 407 of the method 400) by applying a threshold filter 610 to the increased contrast intensity image 605 to identify spots 642 of the increased contrast intensity image 607 with intensity above a threshold value. The threshold value may be predetermined and may be used to identify regions of localized heating or cooling that result from the flow profile 245.

As also depicted in FIG. 6, the device 201 generates an updated version 609 of the 3D object model 243 (e.g. at the block 409 of the method 400) by assigning the fluidic output locations 242 to the spots 642 to generate the fluidic output locations 242 of the 3D object model 243. For example, the fluidic output locations 242 may be located at the same and/or similar locations of the spots 642 (e.g. as increased contrast intensity image 607 generally corresponds to the 3D object model 243, and/or each has a similar size and/or dimensions as the other). The fluidic output locations 242 may then be stored at the memory 212 and used in the method 300 to generate fluidic components.

Figure 7:
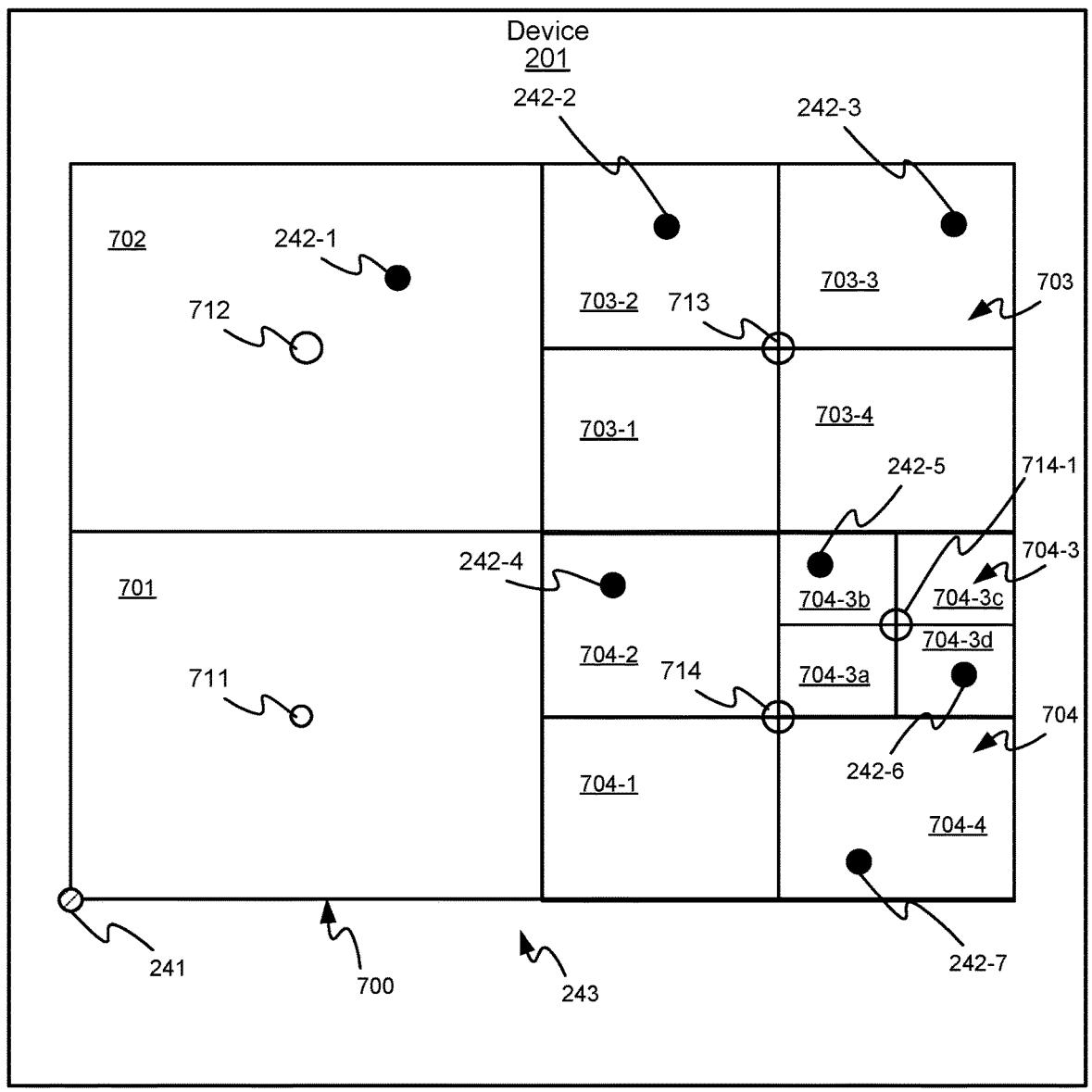
FIG. 7 is a block diagram of a device implementing a portion of a method to generate fluidic components, according to an example.

Attention is next directed to FIG. 7 which depicts the device 201 (e.g. the processor 220) implementing an example partitioning of the 3D object model 243. In particular, the 3D object model 243 is again depicted in two dimensions and is schematically represented by a rectangle, though the 3D object model 243 may have any suitable 3D shape, such as the car seat of FIG. 5 and FIG. 6, with the fluidic input location 241 and the fluidic output locations 242 located at the 3D object model 243 at the locations of the spots 642. In particular, fluidic output locations 242-1, 242-2, 242-3, 242-4, 242-5, 242-6, 272-7 are depicted.

The depicted partitioning may occur as a block of the method 300 and/or as a portion of a block of the method 300 (e.g. the block 303) and/or the depicted partitioning may occur prior to the method 300 being implemented.

Figure 8:
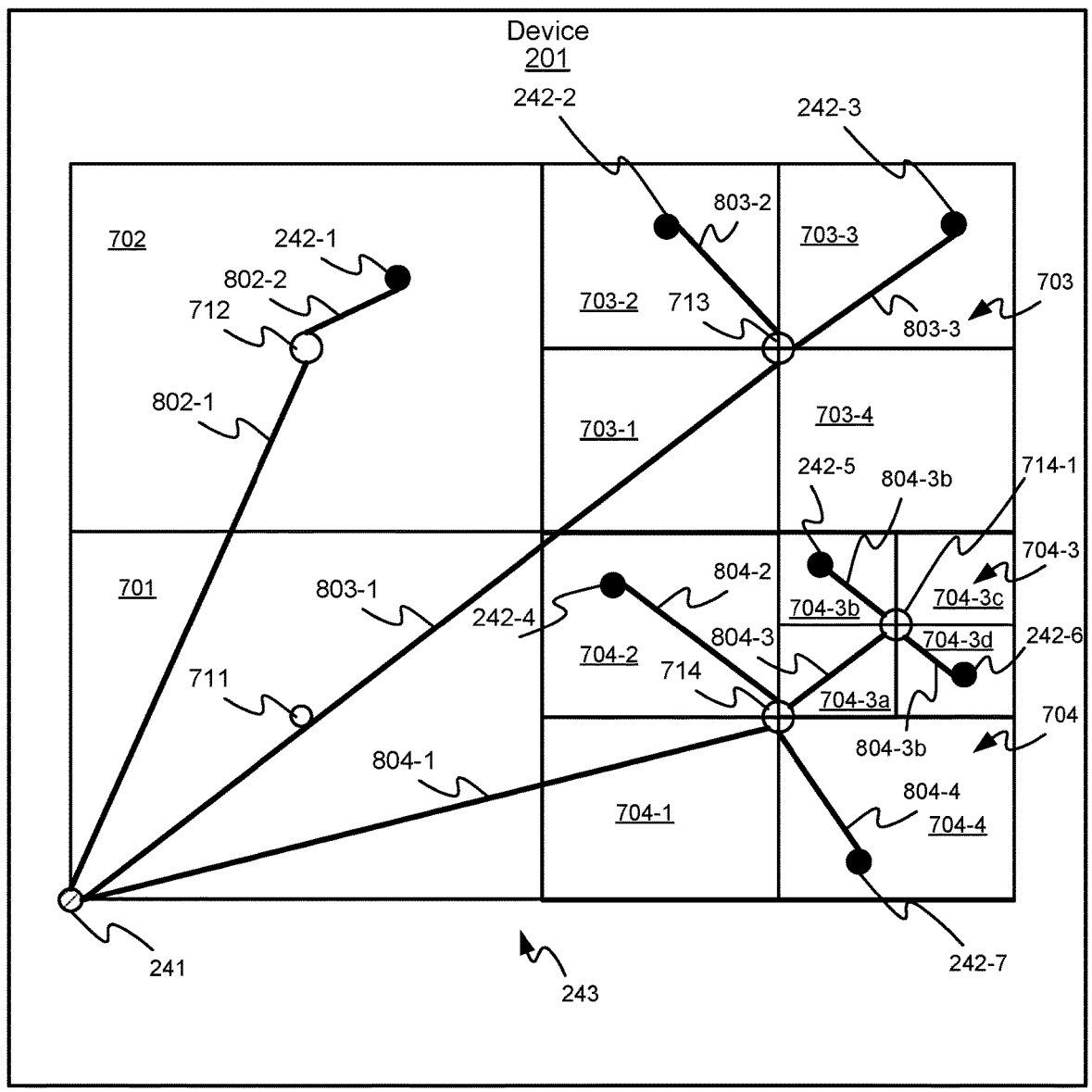
FIG. 8 is a block diagram of a device implementing another portion of a method to generate fluidic components, according to an example.
Figure 9:
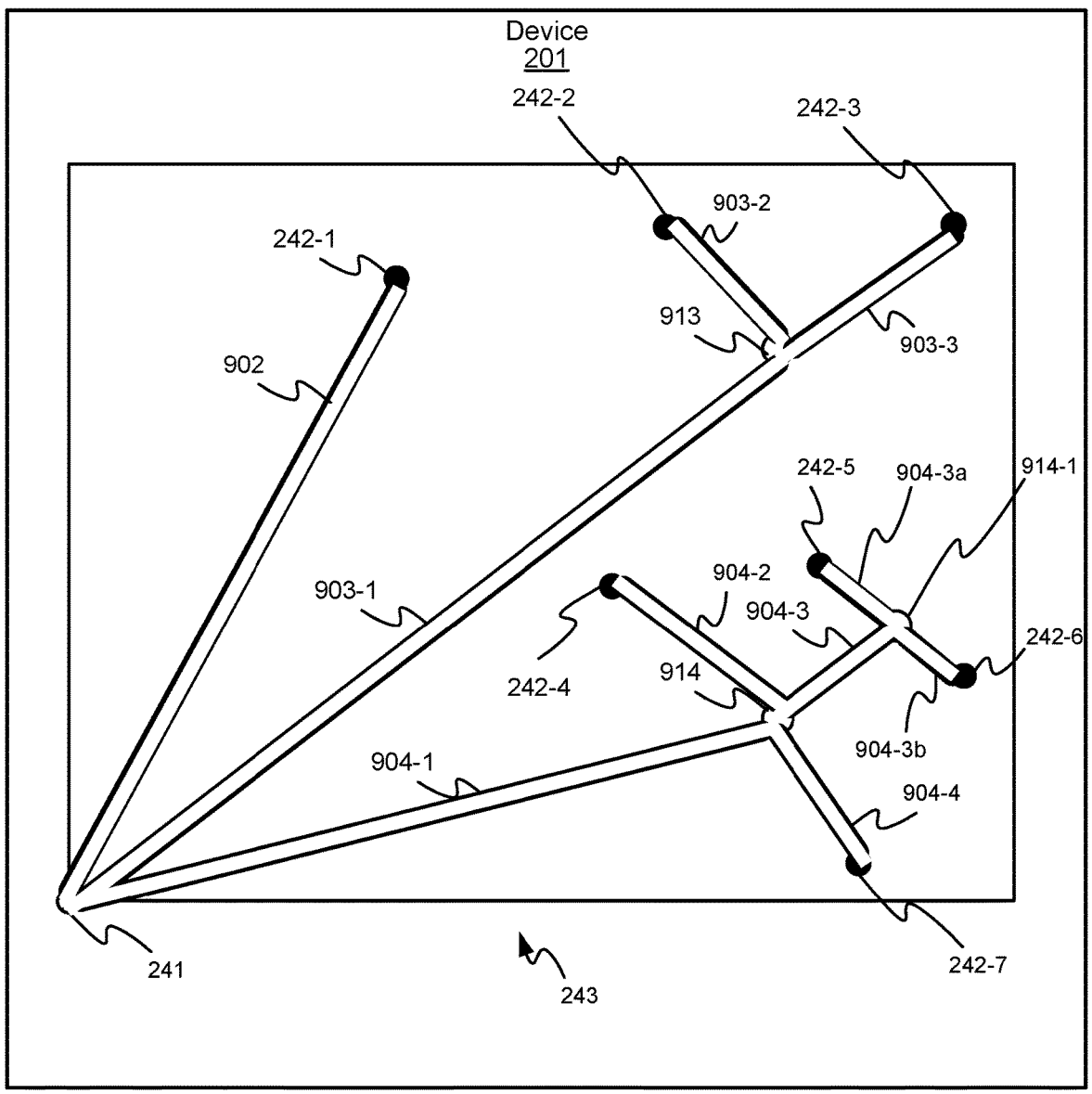
FIG. 9 is a block diagram of a device implementing another portion of a method to generate fluidic components, according to an example.

As depicted, the device 201 is partitioning the 3D object model 243 by partitioning the 3D object model 243 according to a hierarchical structure, such as an octree, until each of the fluidic output locations is located in a respective branch portion of the hierarchical structure, a first node of the hierarchical structure including the fluidic input location 241 for example at a corner thereof. Hereafter the example of FIG. 7, FIG. 8 and FIG. 9 is described with respect to an octree, however any suitable hierarchical structure that may be used for partitioning a 3D object model is within the scope of the present specification.

In general, an octree comprises a tree data structure in which nodes may have eight internal nodes (e.g. other than leaf nodes, described in further detail below). However, the partitioning and/or the octree is depicted in two-dimensions (e.g. similar to a quadtree) for ease of description.

Furthermore, each of the nodes of the octree (and/or portions of a hierarchical structure) may correspond to a respective voxel (e.g. an element of volume that define a three-dimensional space). Hence, the term "partitioning the 3D object model 243 into an octree" may be interchangeably referred to "voxelizing the 3D object model 243 into an octree", and/or portions of the partitioned 3D object model 243 may comprise voxels.

Hence, while the depicted octree is described in two-dimensions, and each node is described with respect to being partitioned into four internal nodes (again similar to a quadtree), it is understood that the technique described in FIG. 7 is occurring in three dimensions such that a node may have eight internal nodes.

Furthermore, an octree structure generally includes a root node (e.g. the first node and/or a first portion of an octree hierarchical structure) which is partitioned into eight internal nodes, and one or more of the eight internal nodes may be further partitioned, with last and/or smallest partitioned nodes of the internal nodes in the octree being leaf nodes. Indeed, when an internal node is not further partitioned, such an internal node is designated as a leaf node.

As depicted, the octree comprises a root node 700 that has been partitioned into internal nodes 701, 702, 703, 704 (and four more internal nodes, not depicted), each having a respective center 711, 712, 713, 714. As the node 702 was no further partitioned, the node 701 may be designated as a leaf node. Furthermore, the internal node 703 has been partitioned into leaf nodes 703-1, 703-2, 703-3, 703-4, which are not further partitioned. Similarly, the internal node 704 has been partitioned into internal nodes 704-1, 704-2, 704-3, 704-4, with nodes 704-1, 704-2, 704-4 being designated as leaf nodes as they are not further partitioned. However, the internal node 704-3 has been partitioned into leaf nodes 704-3a, 704-3b, 704-3c, 704-3d. The internal node 704-3 has a center 714-1.

Hence, as depicted, the device 201 has recursively partitioned the 3D object model 243 into the octree until each of the fluidic output locations 242 is located in a respective leaf node of the octree, and a root node 700 of the octree includes the fluidic input location 241, for example, as depicted, at a corner thereof.

For example, the node 700, and specifically the node 701, includes the fluidic input location 241. The node 701 was not further partitioned as no fluidic output locations 242 are located therein. As the fluidic input location 241 is located at the node 701, the node 701 may alternatively be referred to as a head node.

The fluidic output location 242-1 is located in the leaf node 702. The node 702 was not further partitioned as only one fluidic output location 242 is located therein.

However, the internal node 703 was partitioned into leaf nodes 703-1, 703-2, 703-2, 703-4 as the node 703 includes two fluidic output location 242 (e.g. fluidic output locations 242-2, 242-3); as depicted, the fluidic output location 242-2 is located in the leaf node 703-2, and the fluidic output location 242-3 is located in the leaf node 703-3. The internal node 703 is not further partitioned as there is only one or no fluidic output locations 242, in each of the leaf nodes 703-1, 703-2, 703-2, 703-4.

Similarly, the internal node 704 was partitioned into internal nodes 704-1, 704-2, 704-3, 704-4 as the node 704 includes four fluidic output locations 242 (e.g. fluidic output locations 242-4, 242-5, 242-6, 242-7). Similarly, the internal node 704-3 was partitioned into leaf nodes 704-3a, 704-3b, 704-3c, 704-3d as the node 704-3 included two fluidic output locations 242 (e.g. fluidic output locations 242-5, 242-6). As the nodes 704-1, 704-2, 704-4 were not further partitioned, the nodes 704-1, 704-2, 704-4 are designated as leaf nodes.

Hence, as depicted, the octree includes first internal nodes 703, 704, 704-3 of the octree that include more than one of the fluidic output locations 242 that are recursively partitioned until each of the fluidic output locations 242 is located in a respective leaf node of the first internal nodes 703, 704, 704-3 of the octree. Also as depicted, the octree includes second internal nodes 701, 703-1, 703-4, 704-1, 704-4 that do not include a respective fluidic output location and hence are not further partitioned; however, such second internal nodes 701, 703-1, 703-4, 704-1, 704-4 are then designated as lead nodes.

It is further understood that edges of the nodes 701, 702, 703, 704, etc. do not necessarily exactly correspond to edges of the 3D object model 243.

Indeed, while a given partitioning scheme is depicted, in other examples, partitioning may be at least partially based on resolution; for example, the 3D object model 243 may be recursively geometrically partitioned into 3D portions, such as voxels, and the like, until a given resolution is reached and/or the partitioned 3D object model generally aligns with the 3D object model 243, with more complex regions of the partitioned 3D object model 243 having a higher density of voxels and/or smaller voxels and less complex regions of the partitioned 3D object model 243 having a lower density of voxels and/or larger voxels. Indeed, in some of these examples, the device 201 may recursively partition the 3D object model 243 (e.g. into an octree) based on geometric partitioning and/or until one or two of the fluidic output locations 242 are located in a respective leaf node (e.g. of the octree).

Attention is next directed to FIG. 8 which depicts an example of the block 303 of the method 300.

In particular, in FIG. 8, the device 201 has generated respective paths 802-1, 802-2, 803-1, 803-2, 803-3, 804-1, 804-2, 804-3, 804-3a, 804-3b, 804-4, between the fluidic input location 241 and each of the fluidic output locations 242 via associated portions of the 3D object model 243, and in particular via associated nodes of the octree of the 3D object model 243.

For example, the respective paths 802-1, 802-2, 803-1, 803-2, 803-3, 804-1, 804-2, 804-3, 804-3a, 804-3b, 804-4 between the fluidic input location 241 and each of the fluidic output locations 242 are via the centers of portions of the 3D object model 243 that include a fluidic output location 242 or include a respective fluidic output location 242 in a respective sub-portion of the 3D object model 243. With respect to an octree structure, the respective paths 802-1, 802-2, 803-1, 803-2, 803-3, 804-1, 804-2, 804-3, 804-3a, 804-3b, 804-4 between the fluidic input location 241 and each of the fluidic output locations 142 are via: centers of respective internal nodes of the octree that include a leaf node that includes a fluidic output location; or respective centers of leaf nodes of the octree that include a respective fluidic output location.

For example, a path between the fluidic input location 241 and the fluidic output location 242-1 includes: the path 802-1 from the fluidic input location 241 to the center 712 of the leaf node 702, and the path 802-2 from the center 712 of the leaf node 702 to the fluidic output location 242-1 in the node 702.

Similarly, a path between the fluidic input location 241 and the fluidic output locations 242-2, 242-3 includes, the path 803-1 from the fluidic input location 241 to the center 713 of the internal node 703, and respective paths 803-2, 803-3 from the center 713 to each of the fluidic output locations 242-2, 242-3 of the leaf nodes 703-2, 703-3.

Similarly, a path between the fluidic input location 241 and the fluidic output locations 242-4, 242-7 includes, the path 804-1 from the fluidic input location 241 to the center 714 of the internal node 704, and respective paths 804-2, 803-4 from the center 714 to each of the fluidic output locations 242-4, 242-7 of the leaf nodes 704-2, 704-4.

Similarly, a path between the fluidic input location 241 and the fluidic output locations 242-5, 242-6 includes the path 804-1, and the path 804-3 between the centers 714, 714-1, and respective paths 804-3b, 804-3b from the center 714-1 to each of the fluidic output locations 242-5, 242-6 of the leaf nodes 703-3b, 704-3d.

Hence, in these examples, the respective paths are generated from the fluidic input location 241 to the fluidic output locations 242 via centers of portions of the 3D object model 243 that include a fluidic output location 242 or include a respective fluidic output location 242 in a respective sub-portion of the 3D object model 243. Put another way, with respect to an octree, the respective paths are generated from the fluidic input location 241 to the fluidic output locations 242 via: centers of respective internal nodes (e.g. the nodes 703, 704, 704-3) of the octree that include a leaf node that include a fluidic output location 242; or respective centers of leaf nodes (e.g. the node 702) of the octree that include a respective fluidic output location 242.

However, in some examples, when a respective path between the fluidic input location 241 and a respective fluidic output location 242 includes one leaf node center, the device 201 may regenerate the respective path bypassing the node center. For example, the paths 802-1, 802-2 may be replaced by a path between the fluidic input location 241 and the fluidic output location 242-1 that does not include the center 712.

Furthermore, while not depicted, when the 3D object model 243 includes predefined features, the device 201 may route a respective path around the predefined features. Otherwise the respective paths are straight and/or selected to minimize a length thereof.

Attention is next directed to FIG. 9 which depicts an example of the block 305 of the method 300.

In particular, FIG. 9 is substantially similar to FIG. 8, with like components having like numbers. However, in FIG. 9, the nodes of the octree have been removed, and the respective paths have been replaced with respective hollow connectors that have respective fluidic resistance selected such that each of the fluidic output locations have a predetermined flow rate from the fluidic input location 241 to the fluidic output locations 242, for example the flow rate 244.

In particular, the paths 802-1, 802-2 have been replaced with a hollow connector 902 between the fluidic input location 241 and the fluidic output location 242-1 (e.g. corresponding to a path which by-passes the center 712).

The paths 803-1, 803-2, 803-3 have been respectively replaced with hollow connectors 903-1, 903-2, 903-3 between the fluidic input location 241 and the respective the fluidic output locations 242-2, 242-3, and via a branch 913 that corresponds to the center 713.

Similarly, paths 804-1, 804-2, 804-3, 804-3a, 804-3b have been respectively replaced with hollow connectors 904-1, 904-2, 904-3, 904-3a, 904-3b between the fluidic input location 241 and the respective the fluidic output locations 242-4, 242-5, 242-6, 242-6, and via branches 914, 914-1 that respectively corresponds to the centers 714, 714-1.

Hence, the branches 913, 914, 914-1 fluidically distribute fluid and/or gas (e.g. air) and the like to respective fluidic output locations 242. As also depicted in FIG. 9, there is no branch corresponding to the center 712. Indeed, in general, the device 201 may not include branches that correspond to centers connected to one fluidic output location 242, as such a branch would introduce resistance between the fluidic input location 241 and the fluidic output location 242. However, when a center is connected to two fluidic output locations 242 (e.g. and also, in some examples, another center), the device 201 generally replaces that center by a branch. Indeed, in some examples, a branch is connected to no more than two fluidic output locations 242, and one other branch (e.g. the branch 914 is connected to the fluidic output locations 242-4, 242-7, and the branch 914-1) to reduce fluidic resistance.

In some examples, the device 201 may select the respective fluidic resistance of the respective hollow connectors by selecting a respective length, a respective cross-sectional area, and a respective cross-sectional shape of the respective hollow connectors 902, 903-1, 903-2, 903-3, 904-1, 904-2, 904-3, 904-3a, 904-3b, 904-4.

In some examples, the device 201 may adjust the respective fluidic resistance of the respective hollow connectors 902, 903-1, 903-2, 903-3, 904-1, 904-2, 904-3, 904-3a, 904-3b, 904-4 by adjusting fluidic resistance of a respective fluidic output location 242, for example, by increasing or decreasing a size and/or radius, and the like, of a respective fluidic output location 242. However, in examples, sizes of the fluidic output locations 242 may be fixed and hence may not be adjusted.

In yet further examples, the device 201 may adjust the respective fluidic resistance of the respective hollow connectors 902, 903-1, 903-2, 903-3, 904-1, 904-2, 904-3, 904-3a, 904-3b, 904-4 by adjusting fluidic resistance of a respective branch 913, 914, 914-1 in the respective hollow connector 902, 903-1, 903-2, 903-3, 904-1, 904-2, 904-3, 904-3a, 904-3b, 904-4 corresponding to a center of a node.

Indeed, when the 3D object model 243 has been partitioned into an octree, the device 201 generally replace the respective paths with the respective hollow connectors that have the respective fluidic resistance selected such that fluidic resistance distribution is balanced at each level of the octree, for example such that fluid and/or air flow to each of the fluidic output locations 242 is similar.

Put another way, the fluidic resistance of the hollow connectors (and optionally the branches and/or the fluidic output location 242) is adjusted to achieve the flow rate 244 at each of the fluidic output locations 242.

While the example of FIG. 7, FIG. 8, and FIG. 9 is described with respect to generating respective paths between the fluidic input location 241 and each of the fluidic output locations 242 via centers of respective internal nodes, in other examples the respective paths between the fluidic input location 241 and each of the fluidic output locations 242 may be generated via any suitable point, and the like, at a vertex and/or a face of a portion and/or a voxel and/or a node of the 3D object model 243 as partitioned. Indeed, in some examples, the respective paths between the fluidic input location 241 and each of the fluidic output locations 242 may be generated via vertices of a portion and/or a voxel and/or a node (e.g. of the 3D object model 243 as partitioned) that are closest to the fluidic input location 241; such examples may have advantage of preventing flow reversal in a part as represented by the 3D object model 243 (e.g. such that flow is not at least partially in a direction back towards the fluidic input location 241, as may occur, for example, in the hollow connector 904-2). However, the respective paths between the fluidic input location 241 and each of the fluidic output locations 242 may be generated via any suitable vertex of a portion and/or a voxel and/or a node, and/or via any suitable point at any suitable face portion and/or a voxel and/or a node, and/or at any suitable point within portion and/or a voxel and/or a node of the 3D object model 243. For examples, suitable points may be selected to prevent flow reversal as described above.

Figure 10:
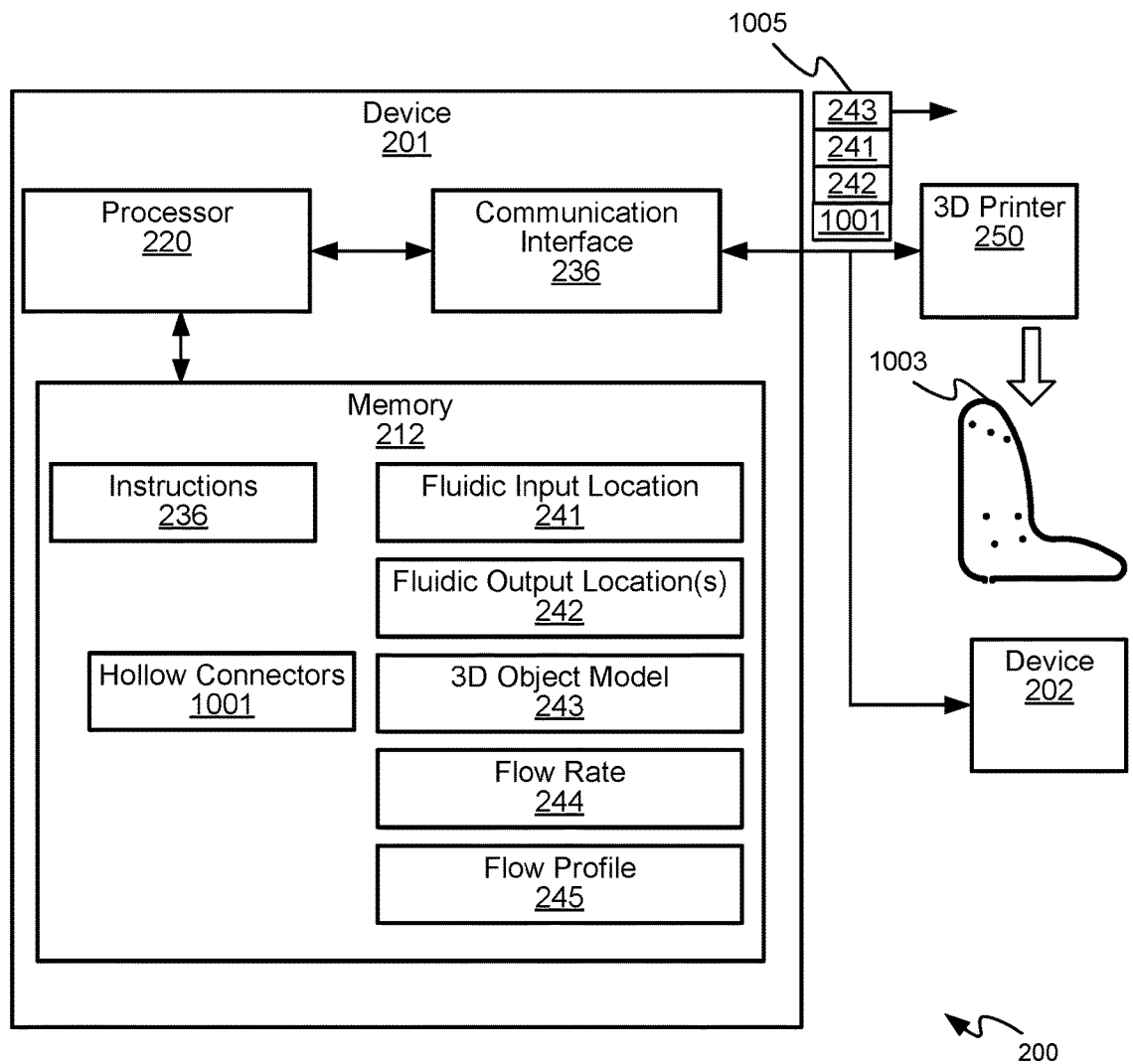
FIG. 10 is a block diagram of a system implementing yet another portion of a method to generate fluidic output locations at a three-dimensional object model, according to an example.

Attention is next directed to FIG. 10 which depicts an example of the block 307 and the block 309 of the method 300. In particular, FIG. 10 is substantially similar to FIG. 2, with like components having like numbers. However, in FIG. 10 the device 201 has stored (e.g. at the block 307 of the method 300) data 1001 indicative of locations and dimensions of the respective hollow connectors. Further, in FIG. 10, the device 201 is controlling the 3D printer 250 to print a part 1003 that corresponds to the 3D object model 243 by transmitting, to the 3D printer 250, data 1005 that includes the fluidic input location 241, the respective fluidic output locations 242, the 3D object model 243, and the data 1001 indicative of locations and dimensions of the respective hollow connectors. It is understood that the data 1005 further includes data indicative of locations and dimensions of an input at the fluidic input location 241, outputs at the respective fluidic output locations 242. As depicted, the 3D printer 250 has printed the part 1003.

It should be recognized that features and aspects of the various examples provided above may be combined into further examples that also fall within the scope of the present disclosure.

The invention claimed is:

1. A device comprising:
a memory; and
a processor connected to the memory, the memory storing instructions, the processor to execute the instructions to cause the processor to:
receive predetermined locations of a fluidic input location and fluidic output locations at a three-dimensional (3D) object model;
generate respective lines between the fluidic input location and each of the fluidic output locations via associated portions of the 3D object model;
replace the respective lines with respective hollow connectors that have respective fluidic resistance selected such that each of the fluidic output locations have a same flow rate or a predetermined flow rate from the fluidic input location to the fluid output locations;
store, at the memory, data indicative of locations and dimensions of the respective hollow connectors, relative to the fluidic input location and the fluidic output locations, the data for use by a three-dimensional printer to print a part that includes the fluidic input location, the fluidic output locations and the respective hollow connectors; and
control the three-dimensional printer to print the part using the stored data.

2. The device of claim 1, wherein the instructions are further to receive the 3D object model as previously partitioned into portions.

3. The device of claim 1, wherein the instructions are further to partition the 3D object model into portions.

4. The device of claim 1, wherein the instructions are further to partition the 3D object model into portions by partitioning the 3D object model into a hierarchical structure until the fluidic output locations are located in respective portions of the hierarchical structure, and a first portion of the hierarchical structure includes the fluidic input location.

5. The device of claim 1, wherein the instructions are further to generate respective lines between the fluidic input location and each of the fluidic output locations via centers or vertices or faces of portions of the 3D object model that include a fluidic output location or include a respective fluidic output location in a respective sub-portion of the 3D object model.

6. A device comprising:
a memory; and
a processor connected to the memory, the memory storing instructions, the processor to execute the instructions to cause the processor to:
receive predetermined locations of a fluidic input location and fluidic output locations at a three-dimensional (3D) object model;
partition the 3D object model into an octree until each of the fluidic output locations is located in a respective leaf node of the octree, a root node of the octree including the fluidic input location;
generate respective lines between the fluidic input location and each of the fluidic output locations via: centers or vertices or faces of respective internal nodes of the octree that include a leaf node that includes a fluidic output location; or respective centers or respective vertices or respective faces of leaf nodes of the octree that include a respective fluidic output location;
replace the respective lines with respective hollow connectors that have respective fluidic resistance selected such that each of the fluidic output locations have a same flow rate or a predetermined flow rate from the fluidic input location to the fluid output locations;

store, at the memory, data indicative of locations and dimensions of the respective hollow connectors, relative to the fluidic input location and the fluidic output locations, the data for use by a three-dimensional printer to print a part that includes the fluidic input location, the fluidic output locations and the respective hollow connectors; and control the three-dimensional printer to print the part using the stored data.

7. The device of claim 6, wherein the instructions are further to partition the 3D object model into the octree such that:

first internal nodes of the octree that include more than one of the fluidic output locations are recursively partitioned until each of the fluidic output locations is located in a respective leaf node of the first internal nodes; and second internal nodes that do not include a respective fluidic output location are not further partitioned.

8. The device of claim 6, wherein the instructions are further to:

when a respective line between the fluidic input location and a respective fluidic output location includes one node center or one node vertex or one node face, regenerate the respective line bypassing the node center or the one node vertex or the one node face.

9. The device of claim 6, wherein the instructions are further to:

select the respective fluidic resistance of the respective hollow connectors by selecting a respective length, a respective cross-sectional area, and a respective cross-sectional shape of the respective hollow connectors.

10. The device of claim 6, wherein the instructions are further to:

replace the respective lines with the respective hollow connectors that have the respective fluidic resistance selected such that fluidic resistance distribution is balanced at each level of the octree.

11. A device comprising:

a memory; and a processor connected to the memory, the memory storing instructions, the processor to execute the instructions to cause the processor to:

generate locations of a fluidic input location and fluidic output locations at a three-dimensional (3D) object model based on a given flow profile at a surface of the 3D object model;

generate respective lines between the fluidic input location and each of the fluidic output locations via associated portions of the 3D object model;

replace the respective lines with respective hollow connectors that have respective fluidic resistance selected such that each of the fluidic output locations have a predetermined flow rate from the fluidic input location to the fluid output locations;

store, at the memory, data indicative of locations and dimensions of the respective hollow connectors, relative to the fluidic input location and the fluidic output locations, the data for use by a three-dimensional printer to print a part that includes the fluidic input location, the fluidic output locations and the respective hollow connectors; and control the three-dimensional printer to print the part using the stored data.

12. The device of claim 11, wherein the given flow profile is uniform or nonuniform.

13. The device of claim 11, wherein the given flow profile comprises a flow velocity vector distribution at the surface of the part, as represented by the 3D object model, and the instructions are further to:

project flow velocity vectors of the flow velocity vector distribution towards an outward surface normal over the surface of the part to obtain an intensity image;

apply a threshold filter to identify spots of the intensity image with intensity above a threshold value; and assign the fluidic output locations to the spots to generate the fluidic output locations of the 3D object model based on the given flow profile at the surface of the 3D object model.

14. The device of claim 11, wherein the given flow profile comprises a flow velocity vector distribution at the surface of the part, as represented by the 3D object model, and the instructions are further to:

project flow velocity vectors of the flow velocity vector distribution towards an outward surface normal over the surface of the part to obtain an intensity image;

apply an intensity enhancement operator or an inverse-diffusion operator to the intensity image to increase contrast of the intensity image;

apply a threshold filter to identify spots of the intensity image with intensity above a threshold value; and assign the fluidic output locations to the spots to generate the fluidic output locations of the 3D object model based on the given flow profile at the surface of the 3D object model.

15. The device of claim 11, wherein the given flow profile comprises a flow velocity vector distribution at the surface of the part, as represented by the 3D object model, and the instructions are further to:

project flow velocity vectors of the flow velocity vector distribution towards an outward surface normal over the surface of the part to obtain an intensity image;

apply a threshold filter to identify spots of the intensity image with intensity above a threshold value;

increase or decrease the threshold filter to respectively decrease or increase a number of the spots; and assign the fluidic output locations to the spots to generate the fluidic output locations of the 3D object model based on the given flow profile at the surface of the 3D object model.

* * * * *